United States Patent
Aoki

(10) Patent No.: US 11,260,576 B2
(45) Date of Patent: Mar. 1, 2022

(54) INJECTION STRETCH BLOW MOLDING MACHINE AND METHOD FOR MOLDING POLYETHYLENE CONTAINER

(71) Applicant: Aoki Technical Laboratory, Inc., Nagano (JP)

(72) Inventor: Shigeto Aoki, Nagano (JP)

(73) Assignee: Aoki Technical Laboratory, Inc., Nagano (JP)

( * ) Notice: Subject to any disclaimer, the term of this patent is extended or adjusted under 35 U.S.C. 154(b) by 0 days.

(21) Appl. No.: 17/216,733

(22) Filed: Mar. 30, 2021

(65) Prior Publication Data
US 2021/0331371 A1 Oct. 28, 2021

(30) Foreign Application Priority Data

Apr. 23, 2020 (JP) ............................. JP2020-076654

(51) Int. Cl.
*B29C 49/64* (2006.01)
*B29C 49/06* (2006.01)
(Continued)

(52) U.S. Cl.
CPC .......... *B29C 49/6427* (2013.01); *B29C 49/06* (2013.01); *B29C 49/12* (2013.01); *B29K 2071/00* (2013.01); *B29L 2031/712* (2013.01)

(58) Field of Classification Search
CPC ... B29C 49/6427; B29C 49/06; B29C 49/062; B29C 2049/066; B29C 49/12; B29C 45/14008; B29C 49/2408
See application file for complete search history.

(56) References Cited

U.S. PATENT DOCUMENTS 5,364,585 A 11/1994 Takeuchi
5,620,650 A * 4/1997 Nakajima ............... B29C 49/42
264/520
(Continued)

FOREIGN PATENT DOCUMENTS

CN 101885234 A 11/2010
JP H04214322 A 8/1992
(Continued)

OTHER PUBLICATIONS

Office Action dated Apr. 21, 2021, for corresponding European Application No. 20204505.0; consisting of 7-pages.
(Continued)

*Primary Examiner* — Stella K Yi
(74) *Attorney, Agent, or Firm* — Christopher & Weisberg, P.A.

(57) ABSTRACT

An object is to provide an injection stretch blow molding machine and a method for molding a polyethylene container capable of molding a favorable hollow container even if its preform is released from an injection mold early. The injection stretch blow molding machine and the method for molding a polyethylene container molds a preform by injecting and filling a molten polyethylene resin into an injection mold, which includes a cavity mold and a core mold both cooled to a temperature range of 5° C. to 25° C., transfers the molded preform to a blow molding mold, and molds a hollow container by blowing the preform within a time range of ±2 sec from a point in time when a temperature of the preform reaches a first minimum point after a point in time when the injection mold completes being opened.

3 Claims, 7 Drawing Sheets

(51) Int. Cl.
*B29C 49/12* (2006.01)
*B29K 71/00* (2006.01)
*B29L 31/00* (2006.01)

(56) References Cited

U.S. PATENT DOCUMENTS

| | | |
|---|---|---|
| 5,679,306 A | 10/1997 | Nakajima et al. |
| 8,021,596 B2 | 9/2011 | Yoshiike et al. |
| 2006/0290035 A1 | 12/2006 | Yoshiike et al. |
| 2021/0039299 A1 | 2/2021 | Takehana |

FOREIGN PATENT DOCUMENTS

| | | |
|---|---|---|
| JP | H0890643 A | 4/1996 |
| JP | 2000043130 A | 2/2000 |
| JP | 2006346891 A | 12/2006 |
| WO | 2019146701 A1 | 8/2019 |

OTHER PUBLICATIONS

Search Report dated Apr. 9, 2021, for corresponding European Application No. 20204505.0; consisting of 5-pages.
Decision to Grant a Patent, dated Jun. 23, 2020, for corresponding Japanese Application No. 2020-076654; consisting of 7-pages.
Chinese Office Action dated Jan. 4, 2022, for corresponding Chinese Application No. 202011480168.9; consisting of 10-pages.
Chinese Search Report dated Dec. 24, 2021, for corresponding Chinese Application No. 202011480168.9; consisting of 5-pages.

* cited by examiner ures that can reduce a series of molding cycle times have been developed in recent years. In molding a polyethylene container, the molding cycle time is also desirably reduced. However, since the molten resin filled into the injection mold is typically around 250° C. in temperature, it takes a long time for the surface temperature of the preform to reach the setting temperature of the mold (near 100° C.).

With the conventional molding method, the foregoing defects (such as uneven container thickness and the rupture of the preform during blowing) can therefore occur if the preform is released from the injection mold early. The molding cycle time of a polyethylene container is thus difficult to reduce by the conventional molding method.

In view of the foregoing problem, an object of the present invention is to provide an injection stretch blow molding machine and a method for molding a polyethylene container capable of molding a favorable hollow container even if its preform is released from an injection mold early.

Solution to Problem

An injection stretch blow molding machine according to the present invention includes: an injection molding section that includes an injection mold and molds a preform out of a molten polyethylene resin injected and filled into the injection mold, the injection mold including a cavity mold and a core mold both cooled to a temperature range of 5° C. to 25° C.; and a blow molding section that blows the preform molded by the injection molding section. The blow molding section blows the preform within a time range of ±2 seconds from a point in time when a temperature of the preform reaches a first minimum point after a point in time when the injection mold completes being opened.

According to this aspect of the present invention, the temperature of the cavity mold and the core mold is set to the temperature range of 5° C. to 25° C. to quickly cool the surfaces of the preform. Crystalline skin layers can thus be formed on the outer and inner surfaces of the preform early (in particular, the formed skin layers are considered to be, but not limited to, in a thin and hard state). Although the molten resin (preform) is injected and filled into the injection mold and the cooling time of the preform by being in contact with the injection mold is reduced, the preform can thus be released from the mold without problem.

In the present invention, the blow molding section blows the preform within the time range of ±2 seconds from the point in time when the temperature of the preform reaches the first minimum point after the point in time when the injection mold completes being opened. According to the present invention, a favorable polyethylene container can thus be molded in a reduced molding cycle time. A method for measuring the temperature of the preform herein is not limited in particular. Examples thereof may include a method of detecting the amount of infrared rays radiated from the preform with an infrared detection camera or the like, and measuring the temperature on the basis of the amount of infrared rays.

The skin layers are considered to, but not limited to, transition from a crystalline state to an amorphous state when the temperature of the preform reaches the first minimum point after the completion of opening of the injection mold. In other words, according to the present invention, the preform can be released in a state where the crystalline skin layers are formed on the surfaces. In addition, the preform can be blown at or near a point in time when the skin layers transition to a soft amorphous state. A favorable polyethylene container can thus be molded despite the early release.

In the injection stretch blow molding machine according to the present invention, a cooling time of the preform in the injection mold is desirably 1 to 2 seconds, and the preform is desirably released thereafter.

According to this aspect of the present invention, a favorable polyethylene container can be molded even if the cooling time of the preform in the injection mold is set to the foregoing range to release the preform extremely early.

Moreover, in the injection stretch blow molding machine according to the present invention, the blow molding section desirably blows the preform at a stretch ratio of 1.5 to 2.5.

According to this aspect of the present invention, a thin and long, favorable polyethylene container can be molded by setting the stretch ratio of the preform to the foregoing range.

A method for molding a polyethylene container according to the present invention includes the steps of: injecting and filling a molten polyethylene resin into an injection mold to mold a preform, the injection mold including a cavity mold and a core mold both cooled to a temperature range of 5° C. to 25° C.; and transferring the molded preform to a blow molding mold to mold a hollow container. The preform is blown within a time range of ±2 seconds from a point in time when a temperature of the preform reaches a first minimum point after a point in time when the injection mold completes being opened.

According to this aspect of the present invention, the temperature of the cavity mold and the core mold is set to the temperature range of 5° C. to 25° C. to quickly cool the surfaces of the preform. Crystalline skin layers can thus be formed on the outer and inner surfaces of the preform early (in particular, the formed skin layers are considered to be, but not limited to, in a thin and hard state). Although the molten resin (preform) is injected and filled into the injection mold and the cooling time of the preform by being contact with the injection mold is reduced, the preform can thus be released from the mold without problem.

In the present invention, the preform is blown within the time range of ±2 seconds from the point in time when the temperature of the preform reaches the first minimum point after the point in time when the injection mold completes being opened. According to the present invention, a favorable polyethylene container can thus be molded in a reduced molding cycle time. The state transition of the skin layers when the temperature of the preform reaches the first minimum point after the point in time when the injection mold completes being opened is considered to be, but not limited to, the same as described above. Examples of a method for measuring the temperature of the preform may include a method of detecting the amount of infrared rays radiated from the preform with an infrared detection camera or the like, and measuring the temperature on the basis of the amount of infrared rays.

Moreover, in the method for molding a polyethylene container according to the present invention, a cooling time of the preform in the injection mold is desirably 1 to 2 seconds, and the preform is desirably released thereafter.

According to this aspect of the present invention, a favorable polyethylene container can be molded even if the cooling time of the preform in the injection mold is set to the foregoing range to release the preform extremely early.

Moreover, in the method for molding a polyethylene container according to the present invention, when the preform is stretch blown in the blow molding mold, a stretch ratio of the preform is desirably 1.5 to 2.5.

According to this aspect of the present invention, a thin and long, favorable polyethylene container can be molded by setting the stretch ratio of the preform to the foregoing range.

Advantageous Effects of Invention

According to the present invention, an injection stretch blow molding machine and a method for molding a polyethylene container capable of molding a favorable hollow container despite early release of its preform from an injection mold can be provided. According to present invention, the molding cycle time can thus be reduced.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
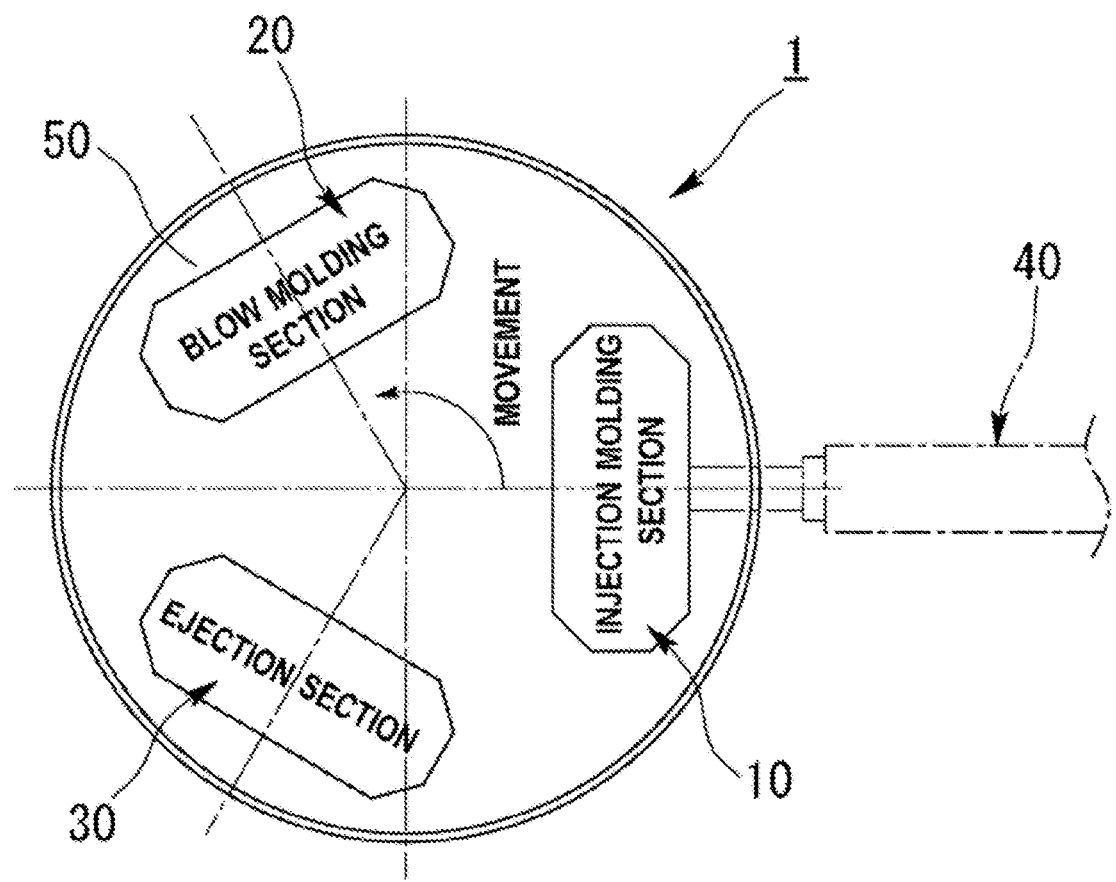
FIG. 1 is a schematic plan view of an injection stretch blow molding machine according to an embodiment.
Figure 2:
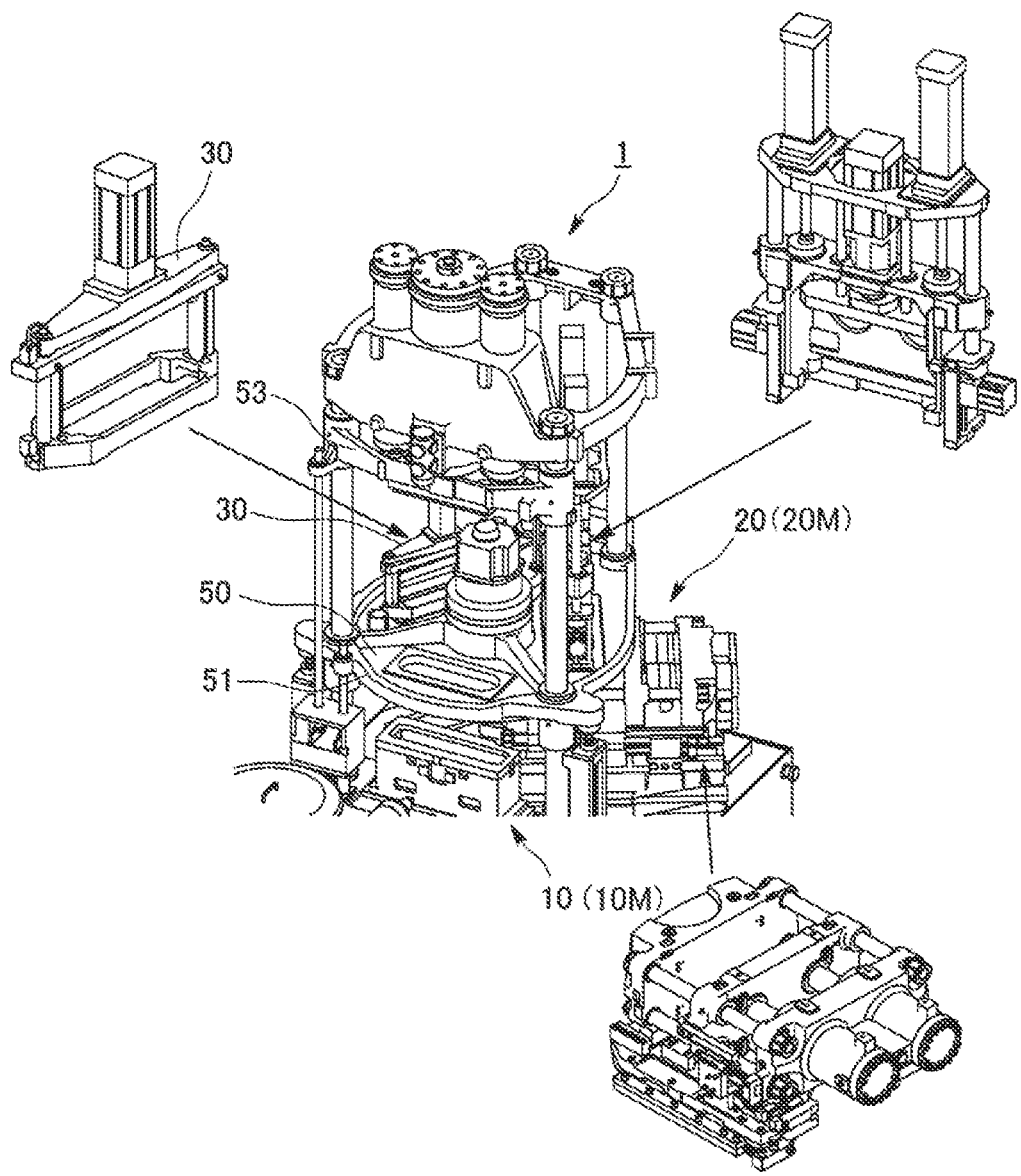
FIG. 2 is a perspective view of the injection stretch blow molding machine according to the present embodiment.
Figure 3:
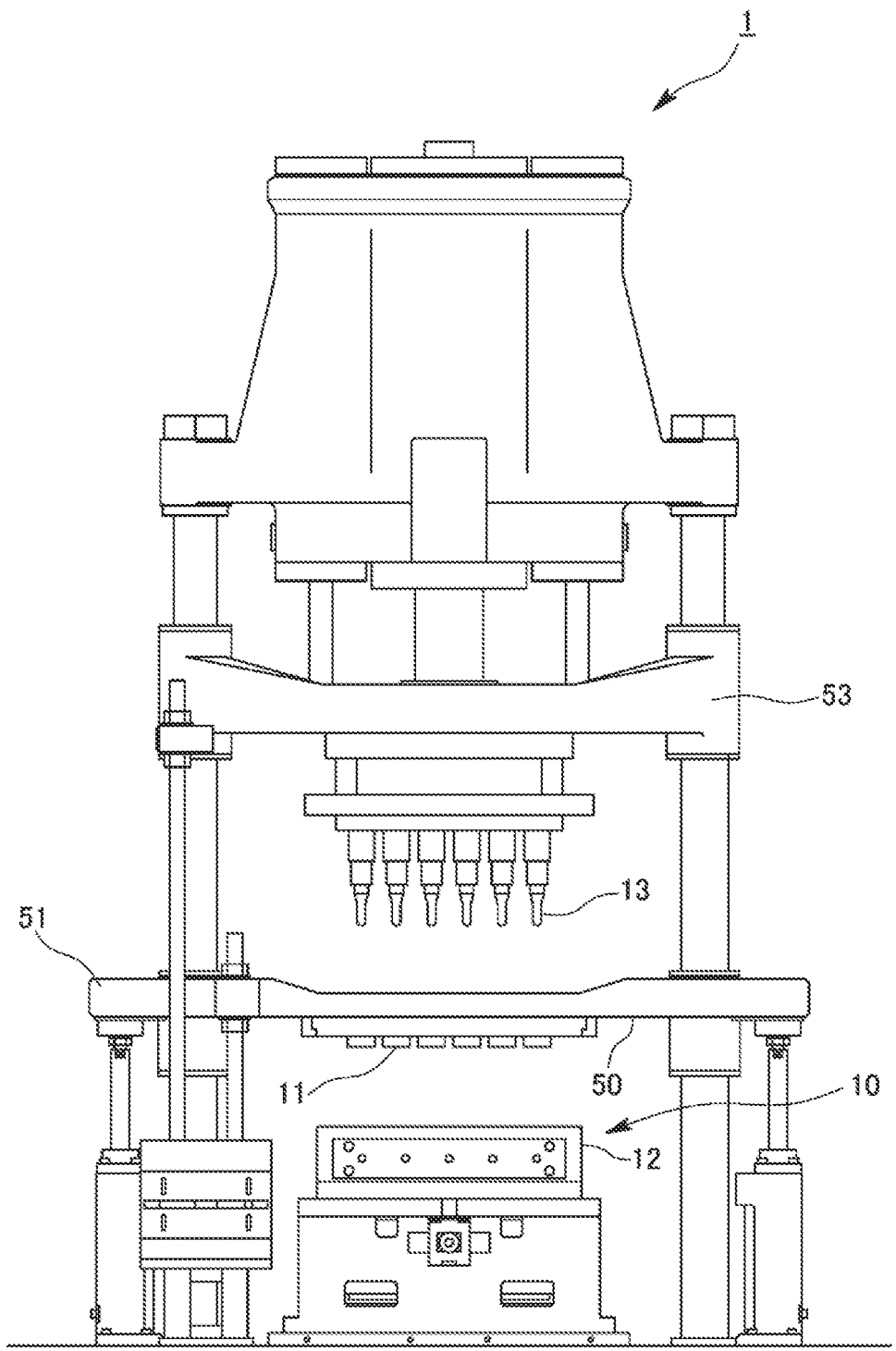
FIG. 3 is a front view of the injection stretch blow molding machine according to the present embodiment (view of the injection stretch blow molding machine seen from in front of an injection molding section)

An injection stretch blow molding machine 1 according to an embodiment of the present invention will be described in detail below with reference to the drawings. An overall configuration of the injection stretch blow molding machine 1 will initially be described with reference to FIGS. 1 to 3. FIG. 1 is a schematic plan view of the injection stretch blow molding machine 1 according to the present embodiment. FIG. 2 is a perspective view of the injection stretch blow molding machine 1. FIG. 3 is a front view of the injection stretch blow molding machine 1 (view of the injection stretch blow molding machine 1 as seen from in front of an injection molding section 10).

As shown in FIG. 1, the injection stretch blow molding machine 1 according to the present invention includes stations, namely, the injection molding section 10, a blow molding section 20, and an ejection section 30. The stations, i.e., the injection molding section 10, the blow molding section 20, and the ejection section 30 are circumferentially arranged at intervals of approximately 120° from each other. A hot runner mechanism (not shown) included in the injection molding section 10 is connected to an injection apparatus 40. The injection apparatus 40 fills a molten resin (polyethylene) into the injection molding section 10.

As shown in FIGS. 2 and 3, the injection stretch blow molding machine 1 further includes a rotary plate 50. The rotary plate 50 is located above the stations and intended to transfer preforms or hollow containers to the next station. More specifically, the rotary plate 50 is located in an intermediate base 51. When reaching a position above each station, the rotary plate 50 stops for a predetermined time.

Lip molds 11 for forming the mouth portions of preforms or hollow containers are attached to the bottom surface of the rotary plate 50. In the present embodiment, the lip molds 11 transfer the preforms or hollow containers to the next stations while holding the mouth portions of the preforms or hollow containers. The injection stretch blow molding machine 1 desirably includes a control unit (not shown) for controlling a series of operations. For example, an operation program is desirably stored in a storage area (ROM) of the control unit. The operations of the injection molding section 10, the blow molding section 20, the ejection section 30, the rotary plate 50, and the like to be described below are desirably controlled by the stored operation program.

An operation example of the injection stretch blow molding machine 1 according to the present embodiment will now be described. An injection mold 10M of the injection molding section 10 to be described below is initially filled with a molten resin, whereby the bodies and bottoms of preforms are molded in a cavity mold 12, and the mouth portions of the preforms are molded in a lip mold 11. After the molding of the preforms is finished, the lip mold 11 and a core mold 13 are lifted. The preforms the mouth portions of which are held by the lip mold 11 are thus released from the injection mold 10M. Finally, the lip mold 11 lifted to a predetermined position is stopped to complete opening the injection mold 10M.

Next, the rotary plate 50 is rotated to move the lip mold 11 holding the mouth portions of the preforms toward the blow molding section 20. When the lip mold 11 reaches a position above the blow molding section 20, the lip mold 11 and the held preforms are lowered toward the blow molding section 20. The preforms are thereby transferred to the blow molding section 20.

After the transfer of the preforms to the blow molding section 20, the preforms are stretch blown in a blow molding mold 20M of the blow molding section 20 to be described below. Hollow containers are thereby molded out of the preforms. After the molding of the hollow containers, the blow molding mold 20M is opened and the molded hollow containers are released from the blow molding mold 20M. The lip mold 11 holding the mouth portions of the hollow containers is then lifted up.

The rotary plate 50 is further rotated to move the lip mold 11 holding the mouth portions of the hollow containers toward the ejection section 30. When the lip mold 11 reaches a position above the ejection section 30, the lip mold 11 and the hollow containers are lowered toward the ejection section 30. The hollow containers are thereby transferred to the ejection section 30.

Finally, in the ejection section 30, the lip mold 11 releases grip of the mouth portions of the hollow containers, and the hollow containers drop to a container outlet (not shown) of the ejection section 30. As a result, the hollow containers are taken out of the injection stretch blow molding machine 1 through the container outlet.

Figure 4:
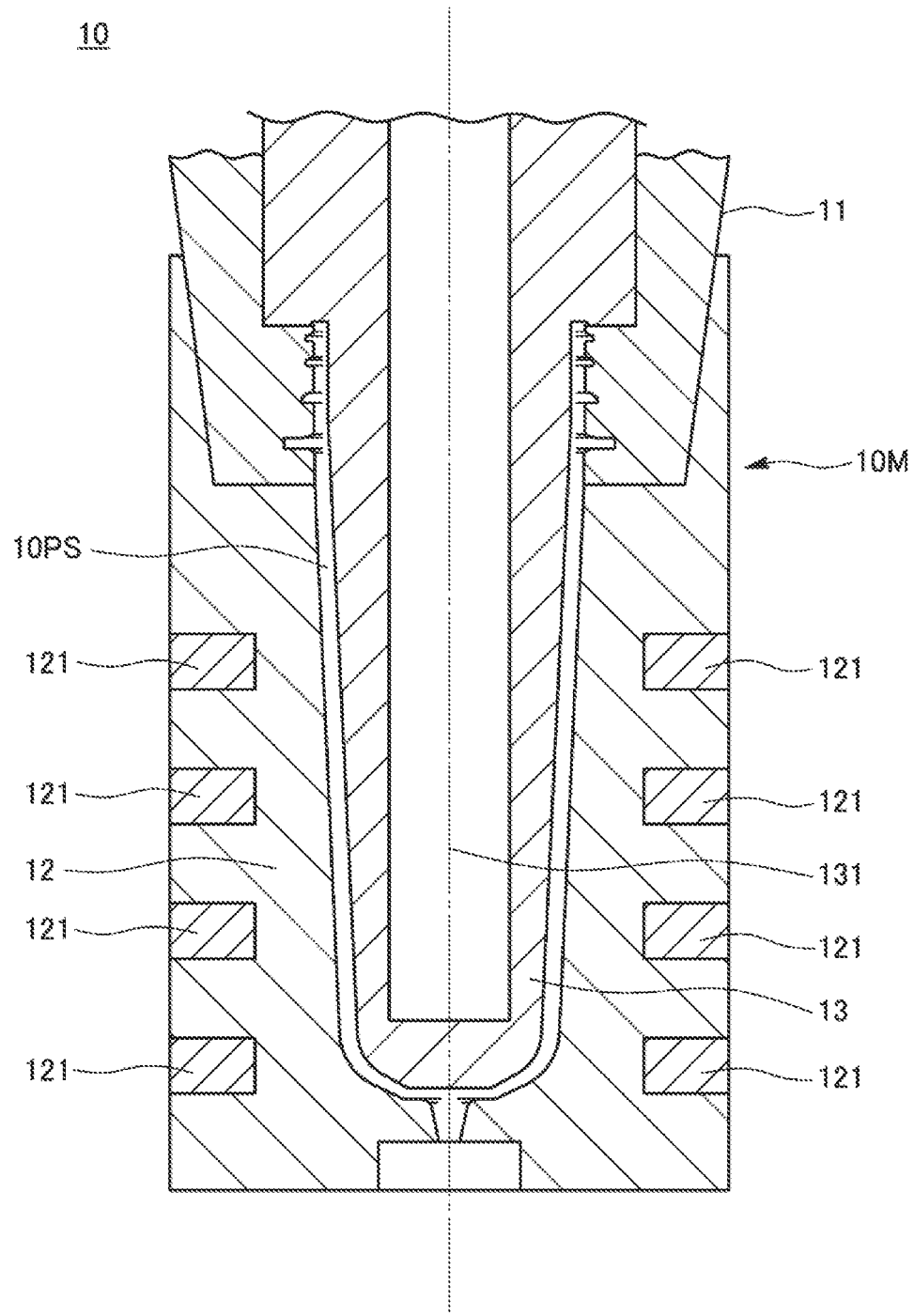
FIG. 4 is a vertical cross-sectional view of an injection mold according to the present embodiment.

Next, the injection molding section 10 according to the present embodiment will be described in detail with reference to FIG. 4. FIG. 4 is a vertical cross-sectional view of the injection mold 10M included in the injection molding section 10. As shown in FIG. 4, the injection mold 10M is formed by a lip mold 11, the cavity mold 12, and the core mold 13.

The cavity mold 12 is fixed to the injection molding section 10. If the rotary plate 50 is rotated and the lip mold 11 reaches a position above the injection molding section 10 (cavity mold 12), the intermediate base 51 including the rotary plate 50 and the lip mold 11 are lowered toward the cavity mold 12. At the same time, the core mold 13 supported by an upper base 53 located above the intermediate base 51 is lowered toward the lip mold 11 and the cavity mold 12. The lowered core mold 13 is passed through the lip mold 11 and inserted into the cavity mold 12. The injection mold 10M is thereby formed.

When the injection mold 10M is formed, as shown in FIG. 4, spaces of predetermined distance are formed between the inside surfaces of the cavity mold 12 and the outside surfaces of the core mold 13 and between the lip mold 11 and the core mold 13. The molten polyethylene resin injected from the injection apparatus 40 into the injection mold 10M is kept still in the spaces for a predetermined time. This cools and solidifies the molten resin to mold preforms. In other words, the spaces correspond to preform forming spaces 10PS.

In the injection stretch blow molding machine 1 according to the present embodiment, after the molten resin (preform) is filled into the preform forming spaces 10PS, the preforms filling the preform forming spaces 10PS are kept still for a predetermined time. Here, the outer surfaces of the preforms are in contact with the cavity mold 12, and the inner surfaces of the preforms are in contact with the core mold 13. As described above, the molten resin heated to approximately 250° C. is filled into the injection mold 10M, and the heat in the preforms is conducted to the cavity mold 12 and the core mold 13. This lowers the temperature of the preforms (the time and process for keeping the preforms still in the injection mold 10M after the filling of the preforms will hereinafter be referred to as "cooling time" and "cooling process", respectively).

As shown in FIG. 4, the cavity mold 12 of the injection mold 10M includes cooling medium (in the present embodiment, chiller water) passages 121. The cooling medium passing through the passages 121 cools the cavity mold 12 to a predetermined temperature range. The core mold 13 also includes cooling medium (in the present embodiment, chiller water) passages 131. The cooling medium passing through the passages 131 forcefully cools the core mold 13 to a predetermined temperature range.

As described above, if the injection mold 10M (cavity mold 12 and core mold 13) cooled in advance is filled with the molten resin (preforms), the outer and inner surfaces of the preforms in contact with the cavity mold 12 and the core mold 13 are quickly cooled. As a result, crystalline hard skin layers are quickly formed on the outer surfaces of the preforms in contact with the cavity mold 12 and the inner surfaces of the preforms in contact with the core mold 13. This can suppress various defects due to such factors as deformation of the preforms during mold release even if the preforms are released from the injection mold 10M early.

In the present embodiment, the cavity mold 12 and the core mold 13 are desirably cooled to a temperature range of 5° C. to 25° C. by the cooling medium (for example, but not limited to, water circulated by a chiller apparatus). The cavity mold 12 and the core mold 13 are preferably cooled to a temperature range of 5° C. to 20° C. by the cooling medium, and more preferably cooled to a temperature range of 10° C. to 15° C.

If the cavity mold 12 and the core mold 13 fall below 5° C. in temperature, the skin layers of the preforms become thicker than expected during mold release and the preforms can be excessively hardened. This is undesirable because the preforms can fail to be blown to a designed container shape in the next blowing step. In addition, the cavity mold 12 and the core mold 13 may be unable to be cooled to a temperature below 5° unless another apparatus having high cooling capacity is used in addition to the chiller apparatus. This is undesirable since the product cost increases.

Similarly, if the cavity mold 12 and the core mold 13 exceed 25° C. in temperature, the cooling medium temperature becomes higher than room temperature. This makes an adjustment to the intended temperature difficult to make by using only the chiller apparatus. Again, the cavity mold 12 and the core mold 13 are difficult to be controlled to a desired temperature unless an apparatus other than the chiller apparatus is used. This is undesirable since the product cost can increase excessively.

The cooling time of the preform in the injection mold 10M is not limited in particular, but is desirably 1 to 2 seconds. As described above, since the cavity mold 12 and the core mold 13 are cooled to a temperature range of, e.g., 5° C. to 25° C., skin layers having appropriate hardness and thickness are formed on the outer and inner surfaces of the preforms even if the cooling time of the preforms is set to an extremely short time. The preforms can thus be released from the injection mold 10M early, and the preforms without problem can be transferred to the blow molding mold 20M. As a result, the time from the start of filling of the molten resin to the release of the preforms can be reduced to reduce the molding cycle time.

Figure 5:
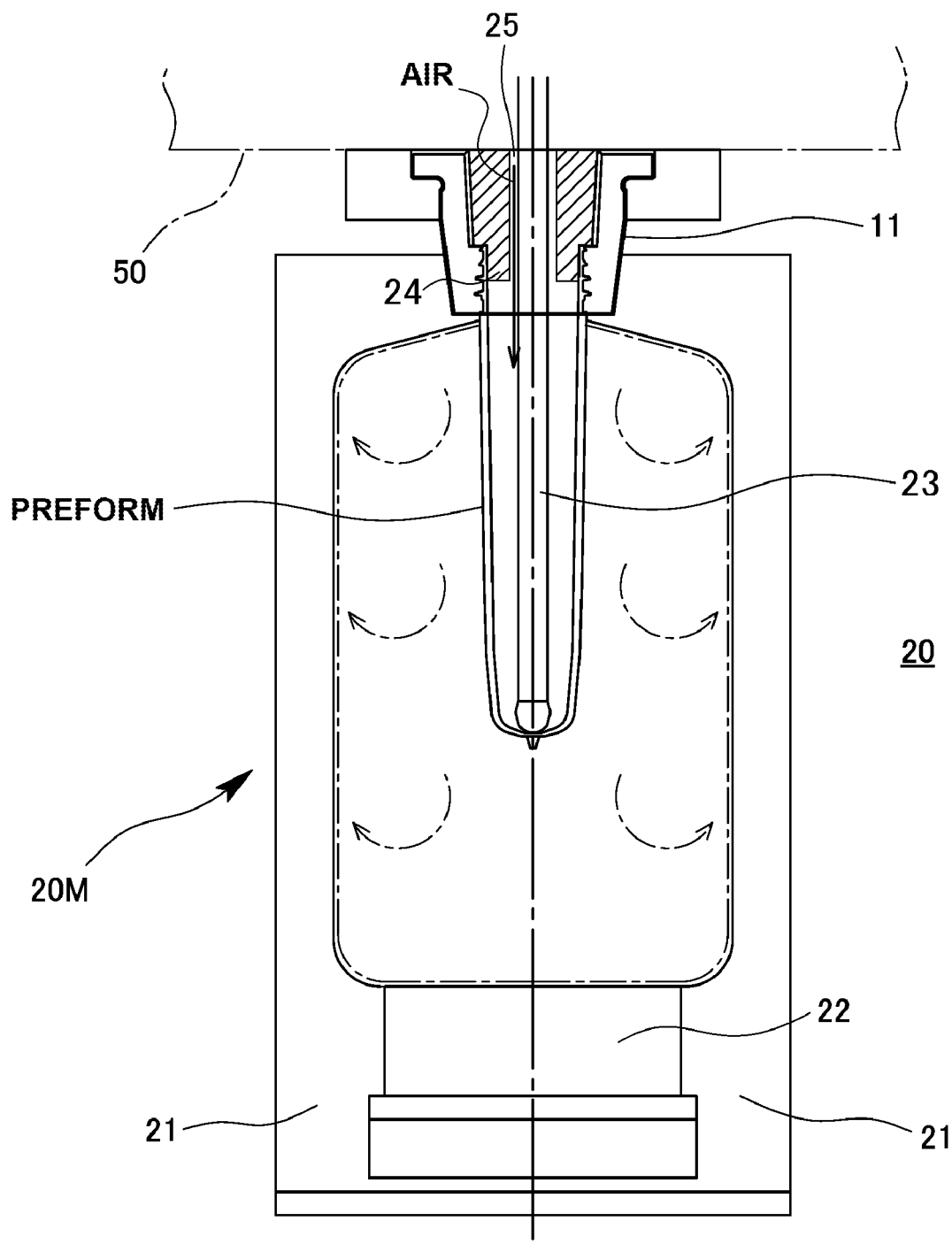
FIG. 5 is a vertical cross-sectional view of a blow molding mold according to the present embodiment.

Next, the blow molding section 20 according to the present embodiment will be described in detail with reference to FIG. 5. FIG. 5 is a vertical cross-sectional view of the blow molding mold 20M included in the blow molding section 20. As shown in FIG. 5, the blow molding mold 20M is formed by the lip mold 11, a blow mold 21 that is a pair of split molds, and a bottom mold 22. The blow molding section 20 further includes stretch rods 23, cylindrical blow cores 24, and an air supply unit (not-shown air compressor or the like). Passages (gaps) 25 for air from the air supply unit to pass through are provided between the stretch rods 23 and the blow cores 24.

The preforms transferred to the blow molding mold 20M are stretched to a predetermined stretch ratio (the length of the stretched preforms/the length of the unstretched preforms) by the stretch rods 23. In addition, almost at the same timing as the stretching of the preforms, the air supplied from the air supply unit is passed through the passages 25 and discharged to the interiors of the preforms held by the lip mold 11. The preforms are thereby blown to mold hollow containers.

The stretch ratio of the preforms is not limited in particular, but is desirably 1.5 or more. Moreover, the stretch ratio of the preforms is desirably 2.5 or less. As described above, the preforms according to the present embodiment have appropriate hardness and thickness. The short preforms released from the injection mold 10M early can thus be molded into favorable long hollow containers.

In a conventional method for molding a polyethylene (for example, high density polyethylene) container, the temperature of the injection mold (cavity mold and core mold) is adjusted to near 100° C. (temperature slightly lower than the melting point temperature of polyethylene) to maintain the preform at high temperature. In the conventional molding method, the injection mold is filled with the molten resin of approximately 250° C., and then the molten resin is cooled to approximately 100° C. by the contact with the injection mold. According to the conventional molding method, a long cooling time is needed. In addition, thick amorphous skin layers are formed on the surfaces of the preform to enable blowing. However, the preform obtained by the conventional molding method contains a smaller amount of heat inside and is less stretchable during blowing. The stretch ratio is thus limited to a low level (for example, 1.2 times). By contrast, the preform according to the present embodiment is quickly cooled by the injection mold 10M cooled to the temperature range of 5° C. to 25° C. As a result, thin hard crystalline skin layers are considered to be formed on the surfaces of the preform. This facilitates the releasing of the preform even after a short cooling time. Since the core layer of the released preform contains a large amount of heat and is maintained in a molten state, the preform is highly stretchable during blowing. A thin favorable polyethylene container can thus be molded even if the stretch ratio is increased (for example, 1.5 to 2.5 times) compared to heretofore.

Figure 6:
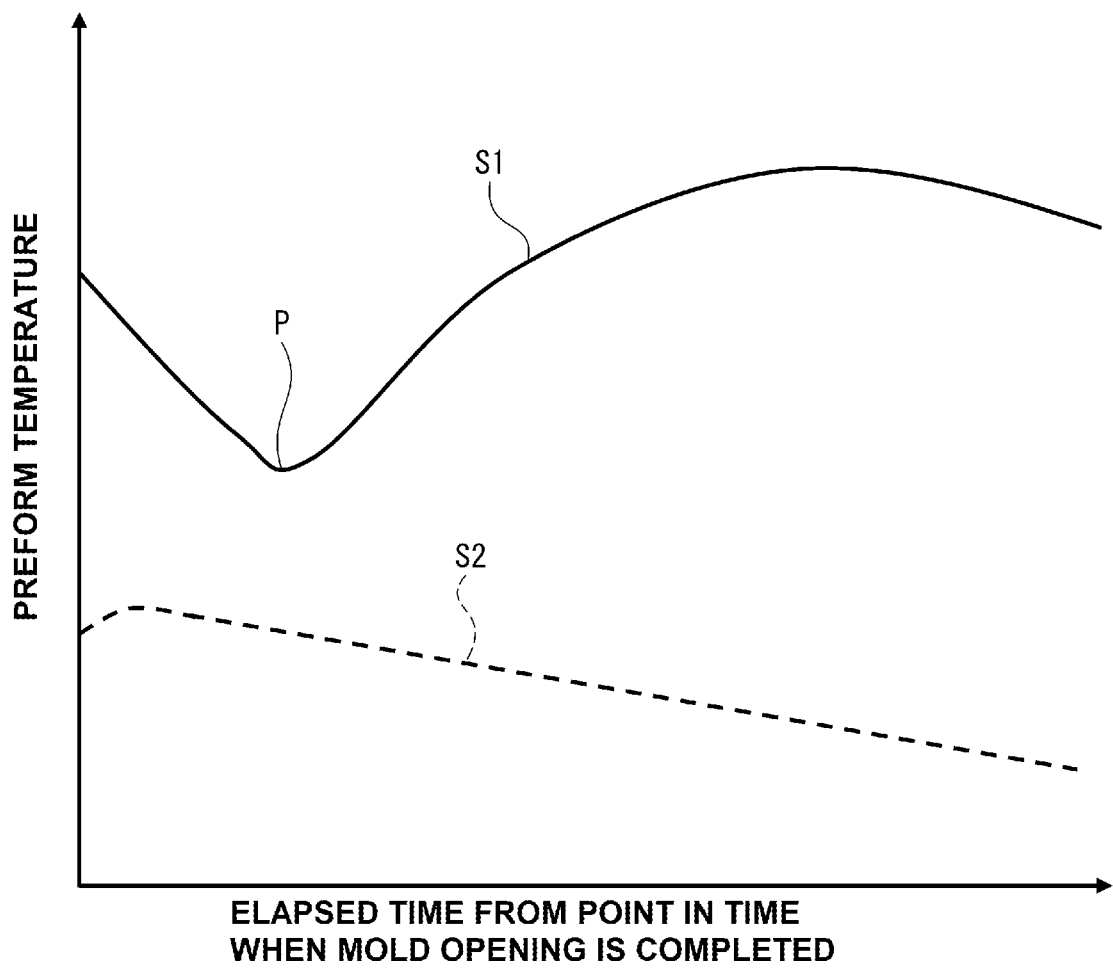
FIG. 6 is a graph showing the tendency of temperature transitions of polyethylene preforms from a point in time when an injection mold completes being opened.

A study made by the inventor has confirmed the following. Suppose, for example, that a polyethylene preform is cooled in the injection mold 10M (cavity mold 12 and core mold 13) in the temperature range of 5° C. to 25° C., and the cooled preform is then released from the injection mold 10M. In such a case, as shown by the curve S1 in FIG. 6, the temperature of the preform drops to reach the first minimum point P after the injection mold 10M completes being opened, and then the preform temperature increases. Such a behavior is not observed in other synthetic resins such as polyethylene terephthalate and polypropylene. The behavior is also different from the temperature behavior of a preform molded by a conventional injection mold adjusted to near 100° C., which is shown by the curve S2 in FIG. 6.

The blow molding section 20 of the injection stretch blow molding machine 1 according to the present embodiment blows the preforms within a time range of ±2 seconds from the point in time when the preform temperature reaches the first minimum point P after the point in time when the injection mold 10M completes being opened. According to the present embodiment, blowing the preforms at the foregoing timing can reduce the molding cycle time and enable formation of favorable hollow containers (for details, see examples to be described below). In other words, the present embodiment is particularly suitable for the molding of polyethylene containers since the blowing step tailored to temperature transitions unique to polyethylene preforms is included.

The temperature of a polyethylene preform molded by the injection mold 10M in the temperature range of 5° C. to 25° C., for example, tends to reach the first minimum point P within, but not limited to, 5 seconds after the completion of opening of the injection mold 10M. Meanwhile, preforms molded by a conventional injection mold adjusted to near 100° C. are blown at a point in time beyond 6 seconds after the completion of opening of the injection mold. According to the present embodiment, the time from the completion of opening of the injection mold 10M to the blowing can be made almost the same as heretofore (in some cases, the time from the completion of mold opening to the blowing according to the present embodiment can be reduced compared to heretofore). Taking into account the foregoing significant reduction in the cooling time of the preforms in the injection mold 10M compared to heretofore, the present embodiment can significantly reduce the molding cycle time.

EXAMPLES

Specific examples of the foregoing injection stretch blow molding machine 1 will be described below. Note that the present invention is not restricted by or limited to the following examples.

Figure 7:
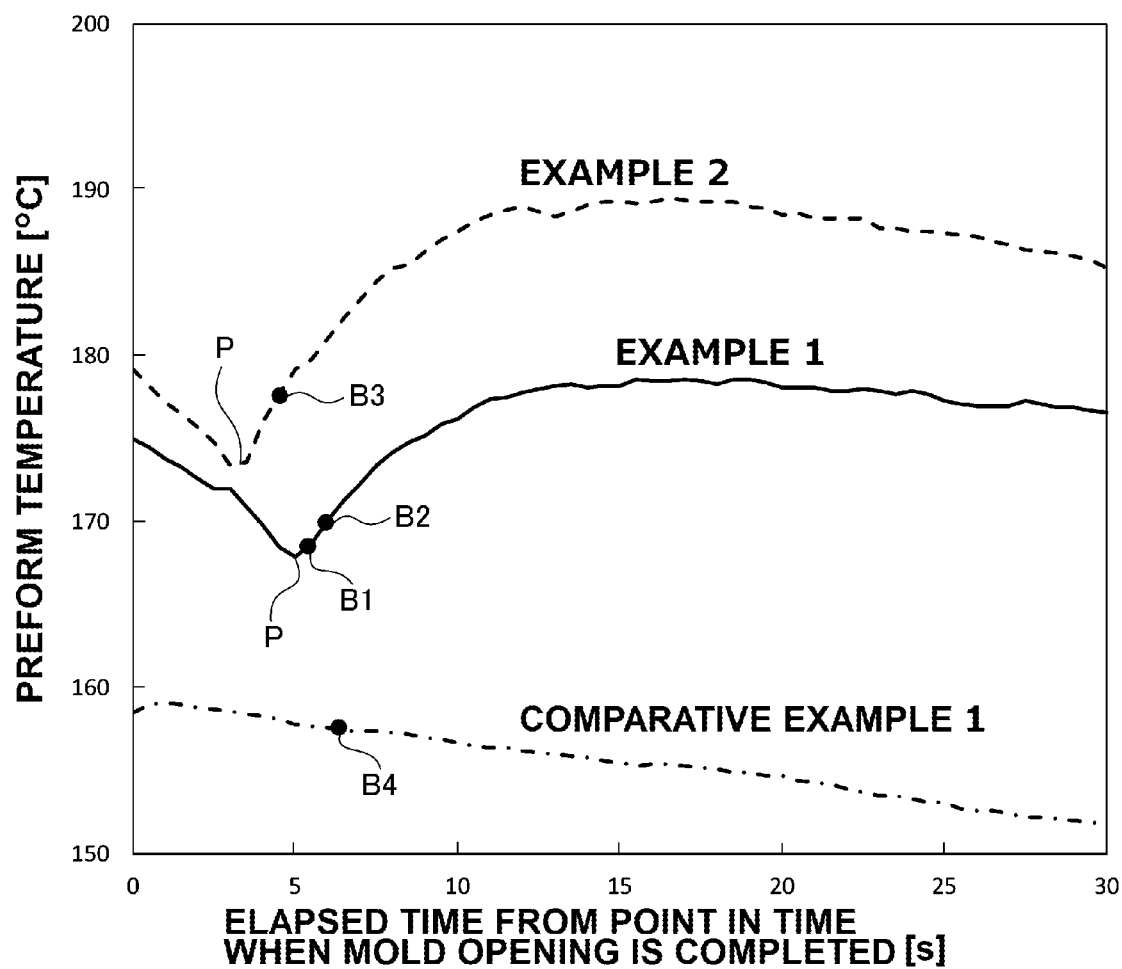
FIG. 7 is a graph showing temperature transitions of preforms according to Example 1, Example 2, and Comparative Example 1.

FIG. 7 shows temperature transitions of preforms of Example 1 (resin pellets: high density polyethylene resin, Marlex (registered trademark), Chevron Phillips Chemical Company LP), Example 2 (resin pellets: high density polyethylene resin, InnoPlus (registered trademark), PTT Polymer Marketing Company Limited), and Comparative Example 1 (resin pellets: high density polyethylene resin, Marlex (registered trademark), Chevron Phillips Chemical Company LP) from the point in time when the injection mold 10M completes being opened.

The horizontal axis of the graph of FIG. 7 indicates the elapsed time (seconds) from the point in time when the injection mold 10M completes being opened (with the point in time when the lip mold 11 and the core mold 13 stop being lifted up and the injection mold 10M completes being opened as 0 seconds). The vertical axis of the graph of FIG. 7 indicates the preform temperature at each time after the completion of the mold opening. In the present examples, the temperature of a preform was measured by a method of detecting the amount of infrared rays radiated from the preform with an infrared detection camera opposed to the front face of the injection mold 10M, and converting the detected amount of infrared rays into temperature. Here, the preform to be measured was held by the lip mold 11 immediately above the cavity mold 12.

As shown in FIG. 7, both the preform temperatures of Example 1 (solid line) and Example 2 (broken line) reached the first minimum point P within 5 seconds after the completion of mold opening (in Example 1, approximately 5 seconds; in Example 2, approximately 3.5 seconds). By contrast, the preform temperature of Comparative Example 1 rose for a short period after the completion of mold opening and then dropped. In other words, no minimum point P was observed in the temperature transitions of Comparative Example 1.

A preform of Example 1 was molded again in the injection mold 10M. The preform was released from the injection mold 10M, and then transferred to the blow molding mold 20M to mold a hollow container. Here, the preform of Example 1 was stretch blown at a point in time (B1 in FIG. 7) after a lapse of approximately 0.35 seconds from the minimum point P. As a result, a favorable hollow container without uneven thickness was molded.

Another preform of Example 1 was molded, and stretch blown at a point in time (B2 in FIG. 7) after a lapse of approximately 1 second from the minimum point P. Again, a favorable hollow container without uneven thickness was molded.

A preform of Example 2 was molded in the injection mold 10M. The preform was released from the injection mold 10M, and then transferred to the blow molding mold 20M to mold a hollow container. Here, the preform of Example 2 was stretch blown at a point in time (B3 in FIG. 7) after a lapse of approximately 1.5 seconds from the minimum point P. As a result, a favorable hollow container without uneven thickness was molded as in Example 1.

Table 1 below shows the molding conditions and molding times of Example 1, Example 2, and Comparative Example 1. The "blowing start time" in Table 1 refers to the time when the preform is blown after the injection mold 10M completes being opened. The blowing start time of Example 1 corresponds to the point B1 in FIG. 7. The blowing start time of Example 2 correspond to the point B3 in FIG. 7. The blowing start time of Comparative Example 1 corresponds to a point B4 of FIG. 7.

TABLE 1

|  | Example 1 | Example 1 | Comparative Example 1 |
|---|---|---|---|
| Core mold temperature | 15° C. | 15° C. | 95° C. |
| Cavity mold temperature | 15° C. | 15° C. | 100° C. |
| Filling time | 2.5 s | 2.1 s | 7 s |
| Cooling time | 1.5 s | 1 s | 6 s |
| Blowing start time | 5.33 s | 4.53 s | 6.33 s |
| Molding cycle time | 12.15 s | 11.35 s | 16.25 s |

※The filling time includes pressure holding time.

As shown in Table 1, in Examples 1 and 2, favorable hollow containers were successfully molded despite significant reductions in the preform molding time (filling time+ cooling time) in the injection mold 10M and the time from the mold release to a start of blowing, compared to Comparative Example 1. Consequently, the molding cycle time was successfully reduced compared to heretofore (Comparative Example 1).

The embodiment according to the present invention has been described in detail above. However, the foregoing description is intended to facilitate the understanding of the present invention, not to limit the present invention. The present invention can include what can be modified or improved without departing from the gist thereof. The present invention also includes equivalents thereof.

REFERENCE SIGNS LIST 1 injection stretch blow molding machine
10 injection molding section
10M injection mold
11 lip mold
12 cavity mold
121 cooling medium passage
13 core mold
131 cooling medium passage
20 blow molding section
20M blow molding mold
21 blow mold
23 stretch rod
30 ejection section
40 injection apparatus
50 rotary plate

What is claimed is:

1. An injection stretch blow molding machine comprising:
an injection molding section that includes an injection mold and molds a preform out of a molten polyethylene resin injected and filled into the injection mold, the injection mold including a cavity mold and a core mold both cooled to a temperature range of 5° C. to 25° C.; and
a blow molding section that blows the preform molded by the injection molding section, wherein
the blow molding section blows the preform within a time range of ±2 seconds from a point in time when a temperature of the preform reaches a first minimum point after a point in time when the injection mold completes being opened.

2. The injection stretch blow molding machine according to claim 1, wherein a cooling time of the preform in the injection mold is 1 to 2 seconds, and the preform is released thereafter.

3. The injection stretch blow molding machine according to claim 1, wherein the blow molding section blows the preform at a stretch ratio of 1.5 to 2.5.

* * * * *